US012681305B2

(12) United States Patent
Xiao et al.

(10) Patent No.: US 12,681,305 B2
(45) Date of Patent: Jul. 14, 2026

(54) HEAD-MOUNTED DISPLAY DEVICE

(71) Applicant: BEIJING UNICORN TECHNOLOGY CO., LTD., Beijing (CN)

(72) Inventors: Jiasheng Xiao, Beijing (CN); Bing Xiao, Beijing (CN)

(73) Assignee: BEIJING UNICORN TECHNOLOGY CO., LTD., Beijing (CN)

( * ) Notice: Subject to any disclaimer, the term of this patent is extended or adjusted under 35 U.S.C. 154(b) by 958 days.

(21) Appl. No.: 17/907,668

(22) PCT Filed: Mar. 17, 2021

(86) PCT No.: PCT/CN2021/081203
§ 371 (c)(1),
(2) Date: Mar. 7, 2023

(87) PCT Pub. No.: WO2021/197060
PCT Pub. Date: Oct. 7, 2021

(65) Prior Publication Data
US 2023/0194872 A1 Jun. 22, 2023

(30) Foreign Application Priority Data

Mar. 31, 2020 (CN) .......................... 202010243452.8

(51) Int. Cl.
*G02B 27/01* (2006.01)
*G02B 1/10* (2015.01)
*G02B 27/10* (2006.01)

(52) U.S. Cl.
CPC ........... *G02B 27/0172* (2013.01); *G02B 1/10* (2013.01); *G02B 27/10* (2013.01)

(58) Field of Classification Search
CPC ....... G02B 27/0172; G02B 1/10; G02B 27/10
See application file for complete search history.

(56) References Cited

U.S. PATENT DOCUMENTS

2019/0155031 A1 5/2019 Dausmann

FOREIGN PATENT DOCUMENTS

CN 207148439 U 3/2018
CN 107884934 A 4/2018
(Continued)

OTHER PUBLICATIONS

Jp H1195160A, translation (Year: 1999).*
(Continued)

*Primary Examiner* — Wen Huang
(74) *Attorney, Agent, or Firm* — K&L Gates LLP

(57) ABSTRACT

An embodiment of the present application provides a head-mounted display device. In the head-mounted display device, an optical imaging apparatus includes an image source element, a beam splitter element, and a reflective element configured to be aligned on an optical path; a structure of an absorbing element and a position of the absorbing element relative to the optical imaging apparatus configured to enable the absorbing element to absorb at least a portion of stray light in a first light region and cause real scene light in a second light region to pass through, the first light region is defined by a human eye mirror position and two ends of the beam splitter element, the second light region is defined by a human eye position, a human eye viewing angle, and an end of the beam splitter element that is away from the image source element, wherein the human eye mirror position is a mirror symmetry point of the human eye position with respect to the beam splitter element.

17 Claims, 9 Drawing Sheets

(56)          References Cited

FOREIGN PATENT DOCUMENTS

| CN | 108227205 | A | 6/2018 |
|----|-----------|---|--------|
| CN | 110095870 | A | 8/2019 |
| CN | 209542958 | U | 10/2019 |
| CN | 111290127 | A | 6/2020 |
| CN | 211577567 | U | 9/2020 |
| JP | H1195160 | A | 4/1999 |
| KR | 20180014567 | A | 2/2018 |

OTHER PUBLICATIONS

Extended European Search Report received in the European Application 21779644, mailed on Jul. 28, 2023.
International Search Report mailed in International Application PCT/CN2021/081203 on Jun. 18, 2021.

* cited by examiner

1100

1110

1130

1120

1140

E

742

743 optical imaging apparatus
100 absorbing element 210 optical path correcting
element 220 head-mounted display device 200 aberration corrector 111 image source element 100

HEAD-MOUNTED DISPLAY DEVICE

CROSS REFERENCES TO RELATED APPLICATIONS

This application is a National Stage of International Application No. PCT/CN2021/081203, filed Mar. 17, 2021, entitled "HEAD-MOUNTED DISPLAY DEVICE," which claims priority to Chinese Patent Application No. 202010243452.8, filed Mar. 31, 2020, entitled "HEAD-MOUNTED DISPLAY DEVICE," both of which are hereby incorporated by reference in their entireties for all purposes.

FIELD

Embodiments of the present application relate generally to the field of smart wearable electronic devices, and more particularly, to a head-mounted display device.

BACKGROUND

With the continuous development of science and technology, head-mounted display devices are widely used in people's daily life, entertainment and work. With the head-mounted display device, an image can be projected on the retina by utilizing an optical imaging system to magnify an image from the ultra-micro display screen, in turn, a large-screen virtual image is presented in the eyes of a viewer.

At present, when a head-mounted display device displays a virtual image, some undesired light (i.e., stray light) irradiates on the optical imaging device, thus image information carried by the stray light affects imaging quality of the virtual image seen by a user, thereby degrading the user experience with respect to the head-mounted display device.

There is currently no good solution in the industry to the problems described above.

SUMMARY

According to an aspect of an embodiment of the present application, a head-mounted display device is provided, including an optical imaging apparatus, the optical imaging apparatus includes an image source element, a beam splitter element, and a reflective element configured to be aligned on an optical path; an absorbing element, a structure of the absorbing element and a position of the absorbing element relative to the optical imaging apparatus configured to enable the absorbing element to absorb at least a portion of stray light in a first light region and cause real scene light in a second light region to pass through, the first light region is defined by a human eye mirror position and two ends of the beam splitter element, the second light region is defined by a human eye position, a human eye viewing angle, and an end of the beam splitter element that is away from the image source element, wherein the human eye mirror position is a mirror symmetry point of the human eye position with respect to the beam splitter element.

BRIEF DESCRIPTION OF THE DRAWINGS

By referring to the following appended drawings, a further understanding of the nature and advantages of the embodiments of the present application may be achieved. In the appended drawings, similar components or features may have the same reference label. The appended drawings are used to provide a further understanding of the embodiments of the present invention and constitute a portion of the present application, and used to, together with the following detailed description, explain the embodiments of the present application, but do not constitute a limitation to the embodiments of the present application. In the appended drawings.

DETAILED DESCRIPTION

The subject described herein will be discussed below with reference to example embodiments. It should be understood that discussion of these embodiments is only to enable those skilled in the art to better understand and implement the subject described herein, and is not to limit the application.

Functions and arrangements of the discussed elements may be changed without departing from the protection scope of the content of embodiments of the present application. Various examples may omit, replace or add various processes or components as needed. In addition, features described with respect to some examples may also be combined in other examples.

As used herein, the term "including" and its variants represents open terms, meaning "including but not limited to." The term "based on" represents "based at least in part on." The terms "one embodiment" and "an embodiment" represent "at least one embodiment." The term "another embodiment" represents "at least one other embodiment." The terms "first", "second", etc. may refer to different or the same objects. Other definitions may be included below, either explicit or implicit. The definition of a term is consistent throughout the application, unless clearly indicated otherwise in the context.

The term "light region" refers to a region in which there is visible light such that physical objects or objects in the light region are visible to human eyes. The term "stray light" refers to undesired light that deviates from the imaging optical path.

Figure 1:
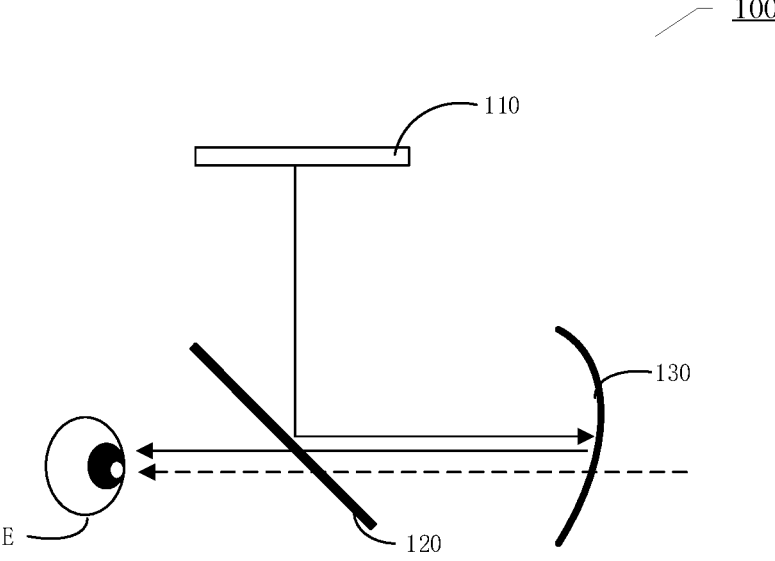
FIG. 1 illustrates a structural schematic diagram of an example of an optical imaging apparatus according to an embodiment of the present application.

FIG. 1 illustrates a structural schematic diagram of an example of an optical imaging apparatus according to an embodiment of the present application.

An optical imaging apparatus 100 as shown in FIG. 1 includes an image source element 110, a beam splitter element 120, and a reflective element 130. The image source element 110, the beam splitter element 120, and the reflective element 130 are aligned with respect to the optical path. In this way, image light projected by the image source element 110 (represented by a solid line in the figure) is amplified by the beam splitter element 120 and the reflective element 130, such that a virtual image can be seen by an eye at position E to achieve the goal of optical path alignment. In the direction of optical path, the beam splitter element and the reflective element are sequentially arranged downstream of the image source element. For example, the beam splitter element is arranged obliquely below, e.g., directly below, the image source element, and the reflective element is arranged on a side of the beam splitter element. That is, virtual image light projected by the image source element is sequentially reflected by the beam splitter element and the reflective element, and then transmitted through the beam splitter element. Virtual image light passing through the beam splitter element can enter the user's eye. Optionally, the beam splitter element 120 and the light reflective element 130 may be coated with a transflective film or a polarizing film. The beam splitter element 120 and the light reflective element 130 in the optical imaging apparatus 100 are see-through element, such that people can view virtual image scene while viewing real world scene (represented by the dotted line in the drawings), thereby implementing Augmented Reality (AR) display function. When a head-mounted display device is provided with the optical imaging apparatus, the head-mounted display device is an AR device.

It should be noted that elements in an optical imaging apparatus 100 can also be adjusted to implement different display functions. For example, a reflective element 130 is replaced with a non-see-through optical component, such that the optical imaging apparatus 100 can implement Virtual Reality (VR) display function. When a head-mounted display device is provided with such optical imaging apparatus, the head-mounted display device is a VR device.

Figure 2:
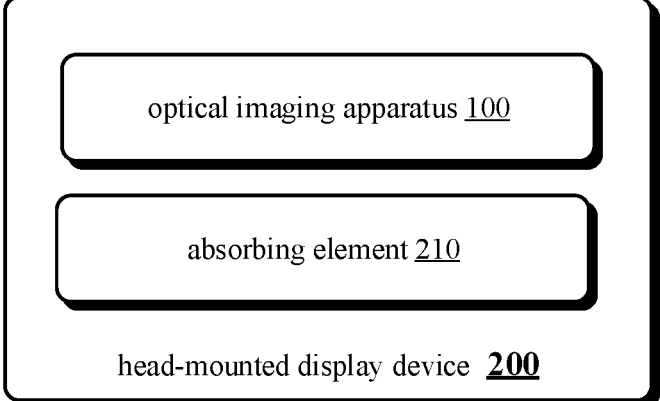
FIG. 2 illustrates a structural block diagram of an example of a head-mounted display device according to an embodiment of the present application.

FIG. 2 illustrates a structural block diagram of an example of a head-mounted display device according to an embodiment of the present application.

As shown in FIG. 2, a head-mounted display device 200 includes an optical imaging apparatus 100 and an absorbing element 210, and the absorbing element 210 can absorb and eliminate visible light. Herein, the absorbing element 210 can eliminate a portion of stray light entering the optical imaging apparatus 100, especially background stray light Z to human eye position E reflected by the beam splitter element 120. It should be understood that human eye position E may represent the position of the user's eye when the user wears the head-mounted display device.

Figure 3:
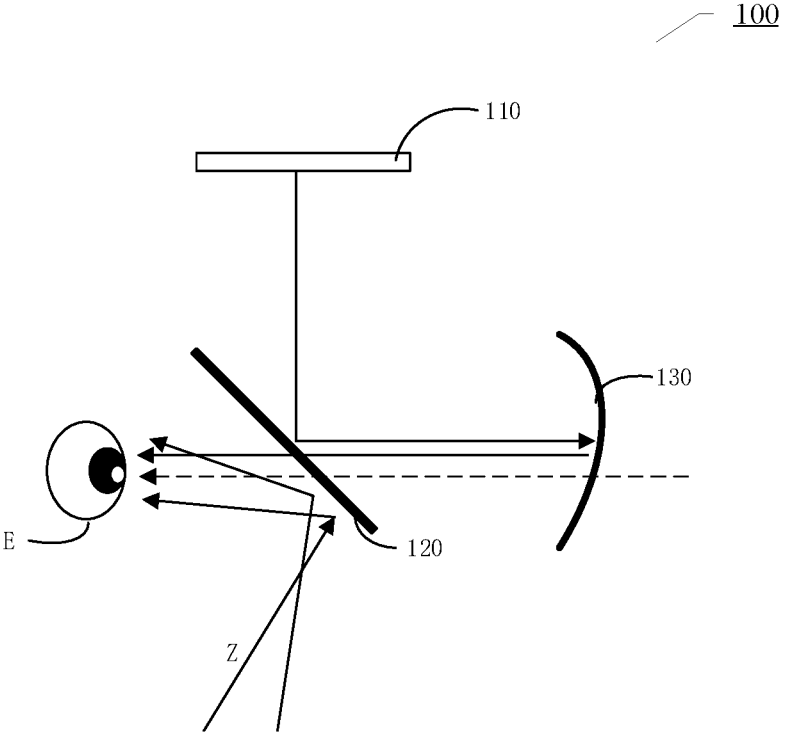
FIG. 3 illustrates a schematic diagram of an example of background stray light absorbed by an absorbing element according to an embodiment of the present application.

FIG. 3 illustrates a schematic diagram of an example of background stray light absorbed by an absorbing element according to an embodiment of the present application.

As shown in FIG. 3, ambient light coming from the region below an optical imaging apparatus 100 and incident on a beam splitter element 120 is reflected to the human eye position E. At this point, in addition to virtual image scenes and real image scenes that can be seen by human eyes, background image information (e.g., ground, clothes, etc.) carried by background stray light also appear, which interferes with image quality.

In an embodiment of the present application, with an absorbing element 210, at least a part (e.g., a part or all) of background stray light Z can be absorbed and eliminated, thereby improving image display quality.

In some application scenarios, when a user wears a head-mounted display device, although the user does not want to see background image information carried by background stray light in an imaging image, the user also needs to be able to see real scene light in external (e.g., under the device) environment through naked eyes directly or in perspective. Therefore, structure and position relative to an optical imaging apparatus of an absorbing element 210 cannot be set arbitrarily, so as to ensure that at least a portion of background stray light is absorbed meanwhile real scene light incident at the human eye position E is not blocked.

Optionally, the structure of an absorbing element 210 and the arrangement of an optical imaging apparatus 100 enable the absorbing element 210 to at least absorb at least a portion of the stray light in a first light region and cause real scene light in a second light region to pass through. Herein, stray light may mainly include background stray light.

Figure 4A:
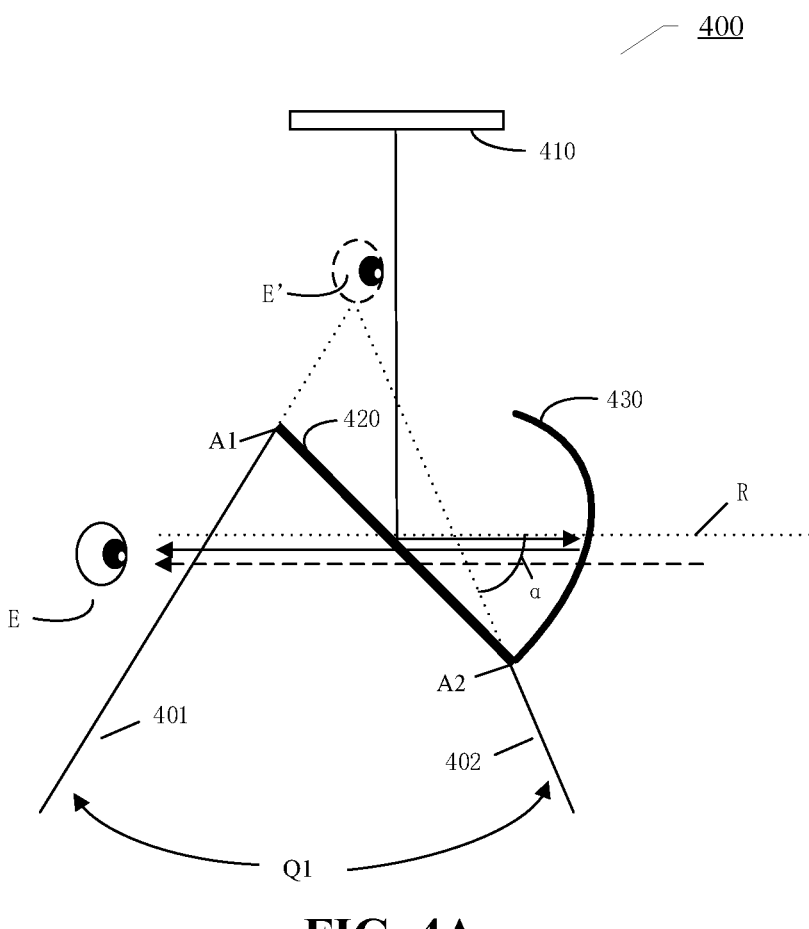
FIG. 4A illustrates a schematic diagram of an example of a first light region in an optical imaging apparatus according to an embodiment of the present application.

FIG. 4A illustrates a schematic diagram of an example of a first light region in an optical imaging apparatus according to an embodiment of the present application.

As shown in FIG. 4A, an optical imaging apparatus 400 includes an image source element 410, a beam splitter element 420, and a reflective element 430 that are aligned on an optical path. In an example of the present application, an end of the beam splitter element 420 is attached to an end of the reflective element 430 that is away from the image source element 410. A human eye mirror position E' is located at the mirror symmetry point of human eye position E with respect to the beam splitter element 420. Herein, a first light region is defined by the human eye mirror position E' and two ends A1 and A2 of the beam splitter element, e.g., a region formed by two beams of light passing through the A1 and A2 ends respectively and incident at the position E'. That is, it is defined by planes passing through the human eye mirror position E' and two ends A1 and A2 of the beam splitter element. Herein, a main optical axis of the optical imaging apparatus 400 can be represented by R, e.g., an included angle of 45 degrees is defined by the beam splitter element 420 and the main optical axis, and an included angle defined by beams of light in different directions and the main optical axis R can be represented by α. The straight line E'A1 can represent the background stray light 401 defining the largest angle with respect to the main optical axis, and the straight line E'A2 can represent the background stray light 402 defining the smallest angle with respect to the main optical axis, and the light region Q1 corresponding to the angle range of the background stray light can be used to represent the first light region. It may be understood that the beam splitter element 420 has an edge extending in a direction perpendicular to paper surface, and there are a plurality of beams of background stray light 401 and 402 passing through the edge and the human eye mirror position E', and a region defined between a first plane through which these beams of background stray light 401 pass and a second plane through which these beams of background stray light 402 pass defines the first light region.

In an embodiment of the present application, an absorbing element can absorb at least a portion of the stray light in a first light region Q1. Therefore, the absorbing element can absorb reflected light incident at the human eye position through a beam splitter element, thereby eliminating background image information in an imaging image and improving imaging quality.

Figure 4B:
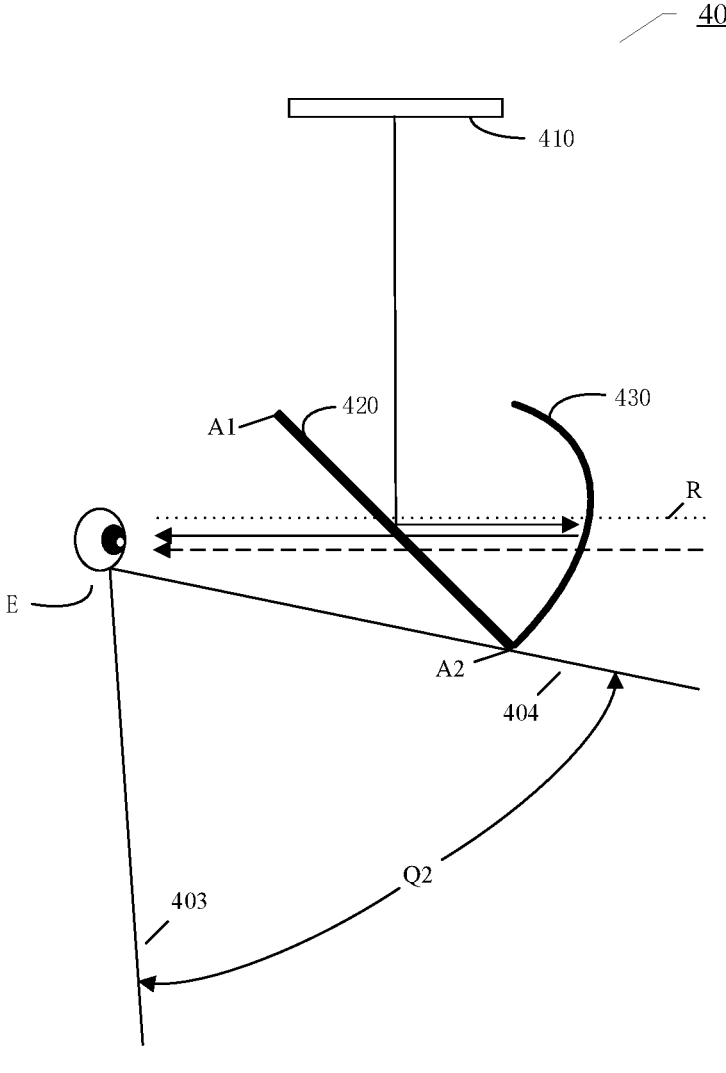
FIG. 4B illustrates a schematic diagram of an example of a second light region in an optical imaging apparatus according to an embodiment of the present application.

FIG. 4B illustrates a schematic diagram of an example of a second light region in an optical imaging apparatus according to an embodiment of the present application.

As shown in FIG. 4B, a second light region is defined by the human eye position E, a human eye viewing angle, and the end A2 of the beam splitter element 420 that is away from the image source element 410. Herein, the human eye viewing angle can represent a certain degree of maximum viewing angle of human naked eye, e.g., viewing angle of human eye is usually 70°. Further, the maximum line-of-sight direction 403 is defined by the human eye position E and the viewing angle of human eye, and the straight line EA2 can represent the minimum line-of-sight direction 404, and the line-of-sight range Q2 of human eye between the maximum line-of-sight direction and the minimum line-of-sight direction can be used to represent the second light region.

In an embodiment of the present application, an absorbing element allows real scene light in the second light region Q2 to pass through. Therefore, the absorbing element does not block human eye from viewing the real scene of the external environment, which can improve viewing experience of a user using a head-mounted display device.

Figure 5:
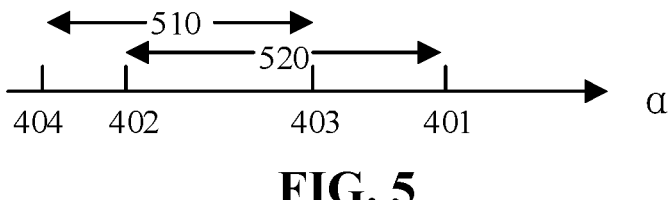
FIG. 5 illustrates a schematic diagram of an angle distribution of an example of included angles between a first light region and a second light region relative to the main optical axis according to an embodiment of the present application.

FIG. 5 illustrates a schematic diagram of an angle distribution of an example of included angles between a first light region and a second light region relative to the main optical axis according to an embodiment of the present application.

As shown in FIG. 5, an included angle interval 510 can represent a second light region Q2 (i.e., line-of-sight angle range) between 403 and 404, and an included angle interval 520 can represent a first light region between 401 and 402 (i.e., stray light angle range). It is not difficult to see that there is a coincident angle interval between the stray light angle range and the line-of-sight angle range. Therefore, in order to absorb at least a portion of stray light in the first light region without blocking real scene light in the second light region, the structure of an absorbing element, and the location of the absorbing element relative to an optical imaging apparatus are particularly important.

Figure 6:
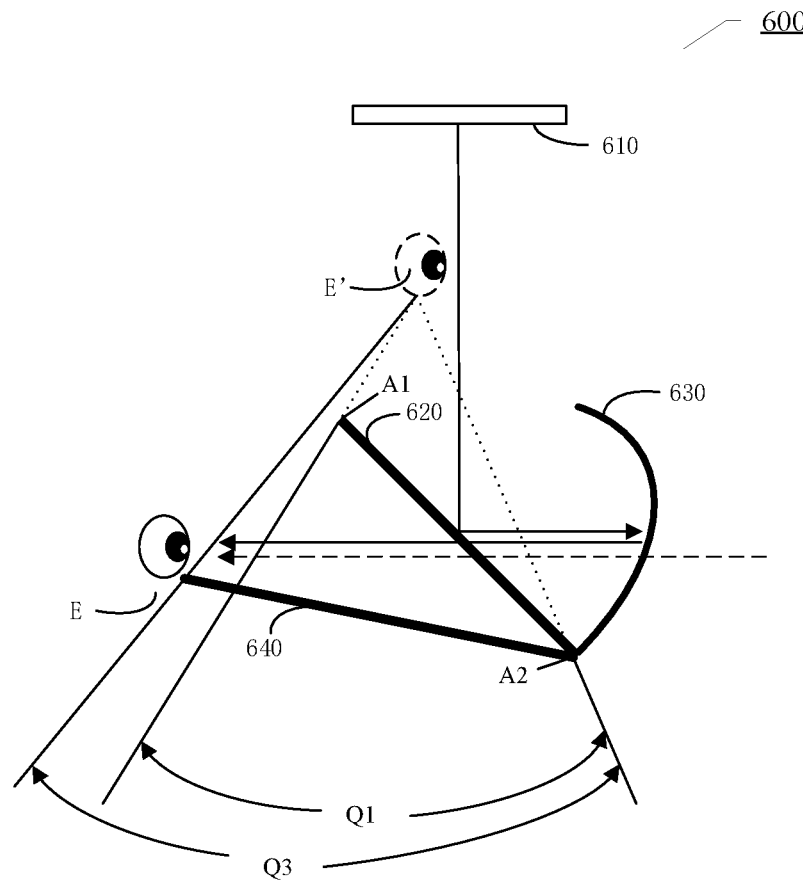
FIG. 6 illustrates a structural schematic diagram of an example of a head-mounted display device according to an embodiment of the present application.

FIG. 6 illustrates a structural schematic diagram of an example of a head-mounted display device according to an embodiment of the present application.

As shown in FIG. 6, a head-mounted display device 600 includes an optical imaging apparatus and an absorbing element 640. The optical imaging apparatus includes an image source element 610, a beam splitter element 620, and a reflective element 630 that are aligned on an optical path. In an example of the present application, the plane in which the absorbing element 640 is located passes through the human eye position E and the end (i.e., the A2 end) of the beam splitter element 620 away from the image source element 610. That is, the absorbing element 640 is coincident with the minimum line-of-sight direction, such that the light absorbing element 640 does not block real scene light within the field of view of the human eye. In addition, a region defined by straight lines passing through a human eye mirror position E' and two ends of the absorbing element covers a first light region. Referring to the example shown in FIG. 6, region Q3 defined by straight lines passing through the human eye mirror position E' and two ends of the absorbing element includes region Q1, and all background stray light in the stray light range can be absorbed. It should be noted that when the length of the absorbing element 640 is changed, the range of the region Q3 also change accordingly, but the region Q3 may be at least greater than or equal to the region Q1, such that background stray light can be completely covered, and imaging quality is guaranteed. It can be understood that the absorbing element 640 has an edge extending in a direction perpendicular to the paper surface, and there are a plurality of straight lines passing through the edge and the human eye mirror position E', and the region defined between two planes passing through these straight lines is region Q3.

In the example shown in FIG. 6, an end of an absorbing element 640 is attached to the end (i.e., the end A2) of a beam splitter element 620 away from an image source element 610, and the end A2 is attached to an end of a reflective element 630 away from the image source element 610. It should be noted that the reflective element 630 and the image source element 610 in an optical imaging apparatus can also be arranged in other manners. Exemplarily, referring to the example shown in FIG. 1, an end of a reflective element 130 is not attached to an end of a beam splitter element 120, e.g., a non-light-transmitting bracket can be provided between the reflective element 130 and the beam splitter element 120 to connect them. In this case, an end of the absorbing element can also be attached to the end of the beam splitter element away from the image source element or the end of the reflective element away from the image source element, which is not limited herein. However, no matter what arrangement is adopted, the absorbing element 640 should be able to absorb stray light in the first light region and allow the real scene light in the second light region to pass through.

A thickness of an absorbing element 640 can also be adjusted according to requirements of a scene. In an example of the present application, the thickness of the absorbing element 640 is 0.5 mm~5 mm.

Figure 7:
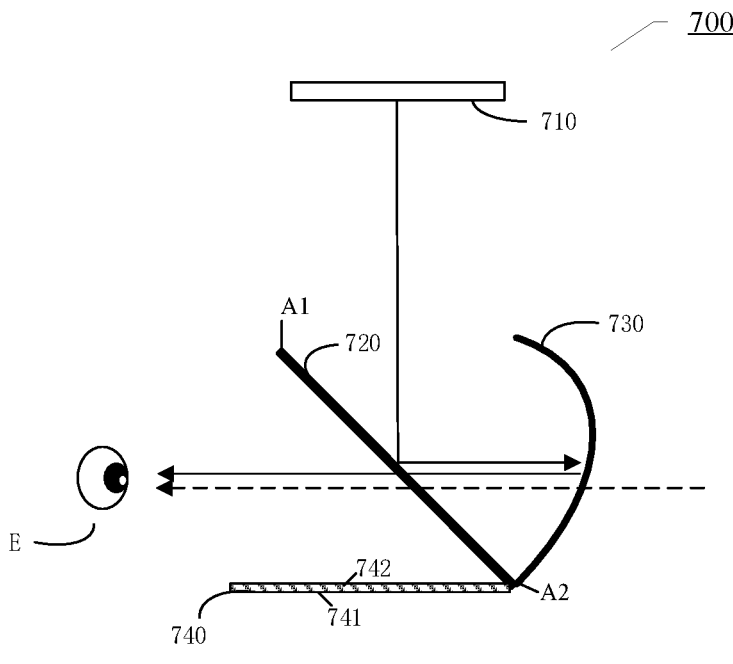
FIG. 7 illustrates a structural schematic diagram of an example of a head-mounted display device according to an embodiment of the present application.

FIG. 7 illustrates a structural schematic diagram of an example of a head-mounted display device according to an embodiment of the present application.

As shown in FIG. 7, a head-mounted display device 700 includes an optical imaging apparatus and an absorbing element 740. The optical imaging apparatus includes an image source element 710, a beam splitter element 720, and a reflective element 730 that are aligned on an optical path. In an example of the present application, the absorbing element 740 includes a substrate 741 and a plurality of absorbing structures 742, the plurality of absorbing structures 742 are arranged sequentially at intervals, and the substrate is see-through. For example, the absorbing structure 742 can be a sheet arranged obliquely on the substrate 741, and respective sheets are arranged at intervals. The region defined by a human eye mirror position and each absorbing structure covers at least a portion of a first light region, and the region defined by a human eye position E and at least one gap covers real scene light in a second light region. Herein, the gap is formed by an interval between adjacent absorbing structures. Furthermore, arrangement of the substrate 741 causes the substrate 741 to allow real scene light to pass through.

Figure 8:
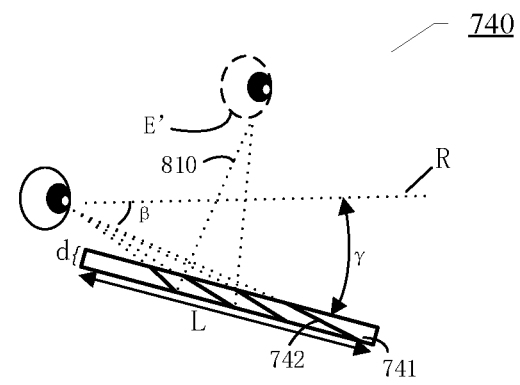
FIG. 8 illustrates a structural schematic diagram of an example of an absorbing element according to an embodiment of the present application.

FIG. 8 illustrates a structural schematic diagram of an example of an absorbing element according to an embodiment of the present application.

As shown in FIG. 8, a substrate 741 of an absorbing element 740 has a flat plate structure, and there may be an included angle γ between the substrate plane and a main optical axis. In FIG. 7, the substrate 741 of the absorbing element can also be parallel to the main optical axis, which may not be limited herein. In addition, there is an included angle 13 between respective absorbing structure 742 in the absorbing element 740 and the main optical axis, and by arranging or adjusting the included angle β and gap size of respective absorbing structures 742, stray light in a first light region can be absorbed and real scene light in a second light region can pass through.

Optionally, respective absorbing structures 742 are used to absorb light, and respective absorbing structures can each be used to define a light-shielding region for a human eye mirror position E'. The light-shielding regions corresponding to adjacent absorbing structures 742 are partially overlapped or just joined, and light-shielding regions corresponding to respective absorbing structures 742 are further combined to cover a first light region. Referring to the example shown in FIG. 8, a light absorbing junction region 810 defined by a first end (e.g., terminal end) of a first absorbing structure and a second end (e.g., head end) of a second absorbing structure that are adjacent in respective absorbing structures passes through human eye mirror position, in which the respective absorbing structures are arranged sequentially at intervals, such that respective light-shielding regions corresponding to respective absorbing structures can cover (or just cover) a first light region after being combined. Herein, the first end of the first absorbing structure and the second end of the second absorbing structure are adjacent to each other, and a second end of the first absorbing structure and a first end of the second absorbing structure are away from each other.

In an example, at least part of adjacent absorbing structures 742 from the absorbing structures 742 arranged sequentially at intervals from a first end (the end adjacent to the human eye position E) to a second end (the end far away from the human eye position E) of an absorbing element 740 are arranged as follows, a first absorbing structure of the adjacent absorbing structures 742 is adjacent to the human eye position E. Each absorbing structure 742 has a first end (an end adjacent to the human eye position E) arranged on a first side of the absorbing structure 742, and a second end (an end away from the human eye position E) arranged on a second side of the absorbing structure 742, where the first side and the second side are arranged oppositely. A plane passing through the first end of the first absorbing structure and the second end of the second absorbing structure (indicated by line 810 in the drawings) passes through a human eye mirror position, such that respective light-shielding shielding regions corresponding to respective absorbing structures can cover (or just cover) a first light region after being combined.

In addition, respective gaps between adjacent absorbing structures 742 can each form a light-transmitting region for the human eye position E, the light-transmitting regions corresponding to adjacent gaps are partially overlapped or just joined, and light-transmitting regions corresponding to respective gaps are further combined to cover a second light region. Referring to the example shown in FIG. 8, a plane in which each absorbing structure 742 is located passes through the human eye position E, such that the plane in which each absorbing structure 742 is located just coincides with a direction of line-of-sight of the human eye without blocking the field of vision of a user, and respective light-transmitting regions corresponding to respective gaps can just cover a second light region after being combined.

In an example of the present application, an inclination angle of respective absorbing structure relative to a main optical axis of an optical imaging apparatus is within a line-of-sight angle range. Referring to the example shown in FIG. 8, β corresponding to respective absorbing structure is within the line-of-sight angle range. As described above, the minimum line-of-sight angle in a line-of-sight angle range is defined by a human eye position and an end of a beam splitter element away from an image source element (e.g., 404 in FIG. 4B), and the maximum line-of-sight angle in a line-of-sight angle range is defined by human eye position and viewing angle (e.g., 403 in FIG. 4B). Therefore, it can be ensured that light passing through respective gap is light in the direction of line-of-sight of a human eye.

It should be noted that, thickness d and length L of a substrate 741 in an embodiment of the present application can vary with different application scenarios. In an example of the present application, thickness d of a substrate 741 can be between 0.1 mm and 10 mm, and length L of the substrate 741 can be between 2 mm and 40 mm.

Figure 9:
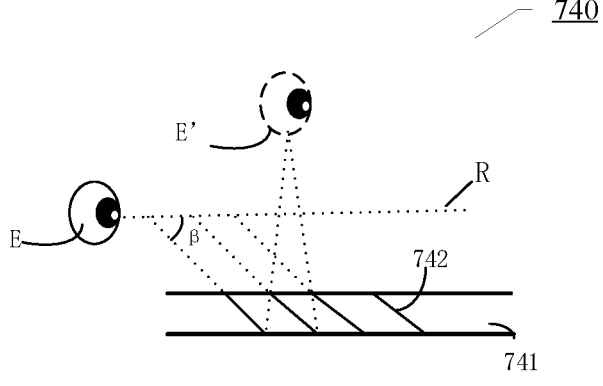
FIG. 9 illustrates a structural schematic diagram of an example of an absorbing element according to an embodiment of the present application.

FIG. 9 illustrates a structural schematic diagram of an example of an absorbing element according to an embodiment of the present application.

As shown in FIG. 9, included angles β between planes in which respective absorbing structures 742 of absorbing element 740 are located and a main optical axis R are equal, i.e., the planes in which respective absorbing structures are located are parallel to each other. It should be noted that, in order to transmit real scene light in a second light region while absorbing stray light in a first light region, intervals between respective absorbing structures 742 in the absorbing element 740 can be diverse or varying, e.g., a plane in which two ends of adjacent absorbing structures adjacent to each other are located can pass through a human eye mirror position. For example, a plane in which two ends, on two sides of the absorbing element 740, of adjacent absorbing structures and adjacent to each other are located can pass through a human eye mirror position. In addition, substrate of the absorbing element 740 can also have other non-planar shapes (e.g., a substrate having a curved surface or a concave shaped structure), such that real scene in a second light region can be seen at a human eye position.

In an example of the present application, a head-mounted display device further includes an optical path correcting element 220, and the optical path correcting element can be configured by at least one of at least one lens component and a reflective component. Also, structure of the optical path correcting element, and the position of the optical path correcting element in or relative to an optical imaging apparatus enable the optical path correcting element to allow light transmitted through respective gaps (e.g., parallel transmission) to reach a human eye position. It should be understood that when parameters such as arrangement angle, size, and interval about respective absorbing structures change, the structure and position of the optical path correcting element may also need to be adjusted accordingly, and the optical path correcting element can also be configured to have a plurality of optical path correcting structures arranged sequentially, thus specific structure and position of the optical path correcting element may not be limited.

As examples of absorbing elements as illustrated in FIGS. 7-9, various absorbing structures can be embedded in a substrate. Alternatively, respective absorbing structure 742 of an absorbing element 740 can also be attached to the surface of the substrate 741.

FIGS. 10A-10D respectively illustrate structural schematic diagrams of different examples of an absorbing element according to embodiments of the present application.

Figure 10A:
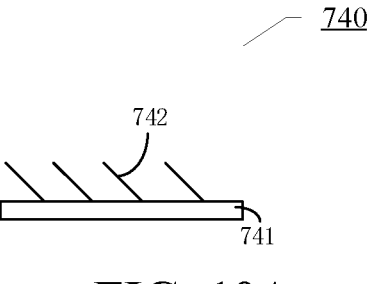
FIG. 10A illustrates a structural schematic diagram of an example of an absorbing element according to an embodiment of the present application.
Figure 10B:
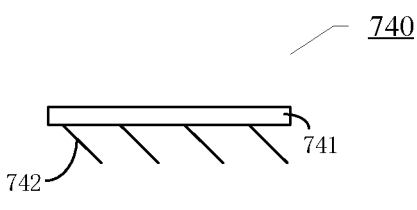
FIG. 10B illustrates a structural schematic diagram of an example of an absorbing element according to an embodiment of the present application.
Figure 10C:
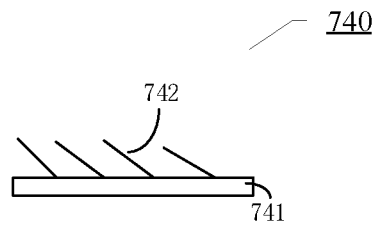
FIG. 10C illustrates a structural schematic diagram of an example of an absorbing element according to an embodiment of the present application.
Figure 10D:
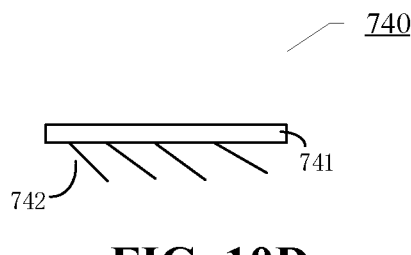
FIG. 10D illustrates a structural schematic diagram of an example of an absorbing element according to an embodiment of the present application.

As shown in FIG. 10A, respective absorbing structures 742 are attached to an upper surface of a substrate 741, and the respective absorbing structures are parallel to each other. As shown in FIG. 10B, respective absorbing structures 742 are attached to a lower surface of a substrate 741, and the respective absorbing structures are parallel to each other. As shown in FIG. 10C, respective absorbing structures 742 are attached to an upper surface of a substrate 741, and the absorbing structures 742 are not parallel to each other, e.g., each of the planes in which the absorbing structures 742 are located can pass through a human eye position. As shown in FIG. 10D, respective absorbing structures 742 are attached to a lower surface of a substrate 741, and the absorbing structures 742 are not parallel to each other. Herein, respective absorbing structures can vary in height. In an example, the height of an absorbing structure may be between 0.2 mm and 20 mm, the thickness of the absorbing structure can be between 0.01 mm and 5 mm, and the thickness of the substrate can be between 0.1 mm and 10 mm.

In addition, respective absorbing structures can also employ a light absorbing coating 743 to implement light absorption, e.g., the light absorbing coating is attached to the absorbing structure 742. In an example of the present application, a plane in which two ends of adjacent light absorbing coatings are located passes through a human eye mirror position, and the two ends are at on opposite sides and adjacent to each other. Planes in which respective light absorbing coatings are located pass through a human eye position. Herein, the absorbing band of the light absorbing coating can include the entire visible light band to absorb visible light.

In some embodiments, respective absorbing structures 742 shown in FIGS. 7-10D are also distributed as a microstructure array, and absorbing elements can employ holographic optical elements or surface-relief gratings, etc.

Figure 11:
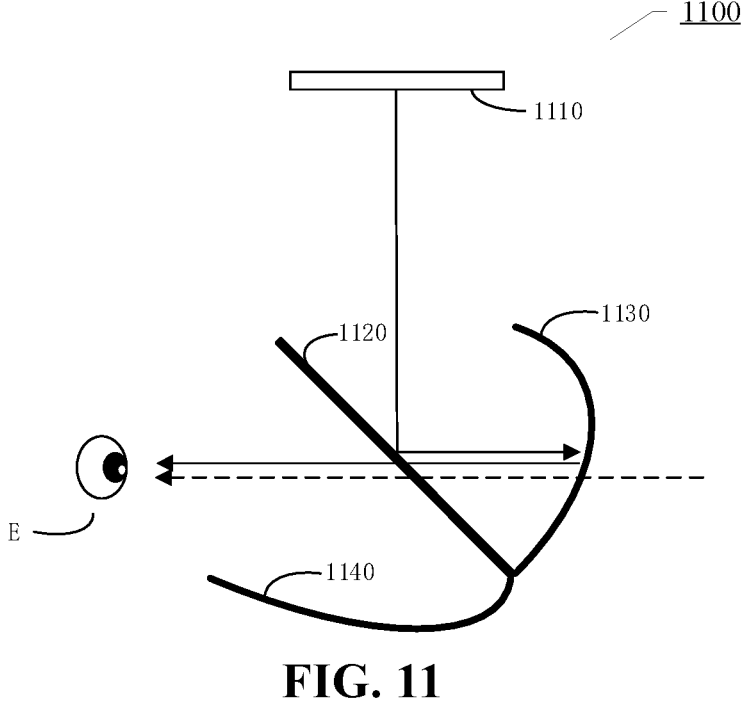
FIG. 11 illustrates a structural schematic diagram of an example of a head-mounted display device according to an embodiment of the present application.
Figure 12:
FIG. 12 illustrates a structural schematic diagram of an absorbing structure with a light absorbing coating according to an embodiment of the present application.
Figures 13, 14:
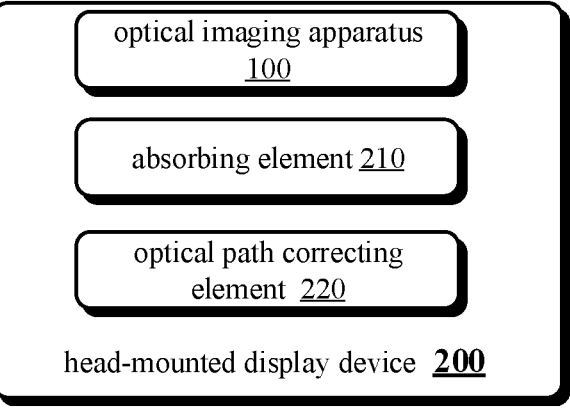
FIG. 13 illustrates a structural block diagram of an example of a head-mounted display device according to an embodiment of the present application.
FIG. 14 illustrates a structural block diagram of an example of an image source element according to an embodiment of the present application.

FIG. 11 illustrates a structural schematic diagram of an example of a head-mounted display device according to an embodiment of the present application.

As shown in FIG. 11, a head-mounted display device 1100 includes an optical imaging apparatus and an absorbing element 1140. The optical imaging apparatus includes an image source element 1110, a beam splitter element 1120, and a reflective element 1130 that are aligned on an optical path. Herein, the absorbing element 1140 is a curved plate, thus the absorbing element 1140 is not limited to a flat plate.

It should be noted that the elements, structures and arrangements of the elements in the optical imaging apparatus shown in the above drawings are only used as examples, and more other elements or structures not listed herein can also be employed as supplement. In an example of the present application, an image source element can further include an aberration corrector 111 to correct aberration in an optical imaging apparatus together with a beam splitter element and a reflective element, which can further facilitate improving the imaging quality. Optionally, an aberration corrector can employ a lens assembly to reduce light emission angle of pixels on an image source element, which is more conducive to blocking stray light under a head-mounted display device, thereby improving user experience when the user wears it.

In addition, the optical path design methods described above in conjunction with the appended drawings can also be adjusted, e.g., optical path design methods such as Birdbath and free-form surface prisms can be employed, which should not be limited here.

For example, a head-mounted display device disclosed in the present application can also include an optical imaging apparatus and an absorbing element. The optical imaging apparatus includes an image source element, a beam splitter element, and a reflective element. In the direction of optical path, the beam splitter element and the reflective element are sequentially arranged downstream of the image source element. For example, the beam splitter element is arranged obliquely below, e.g., directly below, the image source element, and the reflective element is arranged on a side of the beam splitter element. Virtual image light projected by the image source element is sequentially reflected on the beam splitter element and the reflective element, and then passes through the beam splitter element. An end of the beam splitter element away from the image source element can be connected to an end of the reflective element away from the image source element. An end of the absorbing element is connected to the junction of the beam splitter element and the reflective element, and the absorbing element includes a substrate and a plurality of absorbing structures arranged at intervals, each absorbing structure has a head end on a first side of the substrate (adjacent to the beam splitter element) and a terminal end on a second side of the substrate (opposite to the first side), a plane passing through head ends and terminal ends of at least a portion of (e.g., at least three) adjacent absorbing structures intersects the normal of the light-emitting surface of the image source element at a point.

Optionally, the normal of the light-emitting surface of an image source element passes through the center of a beam splitter element.

In an embodiment, planes in which at least a portion of (e.g., at least three) adjacent absorbing structures are located all intersect, on the same straight line, a plane passing through the beam splitter element and parallel to the light-emitting surface of the image source element.

In an embodiment, the plurality of planes in which the plurality of absorbing structures are located are parallel to each other.

Exemplary embodiments are described above by the detailed description set forth in conjunction with the appended drawings, but do not represent all embodiments that may implement the present application. The term "exemplary" used throughout the present application means "serving as an example, instance, or illustration", and not "preferred" or "advantageous" over other embodiments. The detailed description includes specific details for the purpose of providing an understanding of the described techniques. These techniques, however, may be practiced without these specific details. In some instances, well-known structures and apparatuses are shown in block diagram form in order to avoid obscuring the concepts of the described embodiments.

The foregoing description of the present disclosure is provided to enable a person skilled in the art to implement or use the present disclosure. Various modifications to the present disclosure will be readily apparent to those skilled in the art, and the generic principles defined herein may be applied to other variations without departing from the scope of the present disclosure. Thus, the present disclosure is not limited to the examples and designs described herein, but is to be accorded the broadest scope consistent with the principles and novel features disclosed herein.

What is claimed is:

1. A head-mounted display device, comprising:
an optical imaging apparatus, comprising an image source element, a beam splitter element, and a reflective element configured to be aligned on an optical path; and
an absorbing element, a structure of the absorbing element and a position of the absorbing element relative to the optical imaging apparatus configured to enable the absorbing element to absorb at least a portion of stray light in a first light region and cause real scene light in a second light region to pass through, the first light region being defined by a human eye mirror position and two ends of the beam splitter element, the second light region being defined by a human eye position, a human eye viewing angle, and an end of the beam splitter element away from the image source element, wherein the human eye mirror position is a mirror symmetry point of the human eye position with respect to the beam splitter element,
wherein the absorbing element comprises a substrate and a plurality of absorbing structures, the plurality of absorbing structures are arranged sequentially at intervals, a region defined by the human eye mirror position and each of the plurality of absorbing structures covers at least a portion of the first light region, and a region defined by the human eye position and at least one gap covers real scene light in the second light region, wherein the gap is formed by an interval between adjacent absorbing structures; and the substrate is arranged to enable the substrate to allow the real scene light to pass through,
wherein a plane in which a first end of a first absorbing structure and a second end of a second absorbing structure passes through the human eye mirror position, the first absorbing structure and the second absorbing structure from the plurality of absorbing structures are adjacent to each other, the first end of the first absorbing structure and the second end of the second absorbing structure are respectively located on two sides of the absorbing element and adjacent to each other, and a second end of the first absorbing structure and a first end of the second absorbing structure are respectively located on two sides of the absorbing element and away from each other.

2. The head-mounted display device of claim 1, wherein an inclination angle of the plurality of absorbing structures relative to a main optical axis of the optical imaging apparatus is within a line-of-sight angle range, a minimum line-of-sight angle in the line-of-sight angle range is defined by the human eye position and the end of the beam splitter element away from the image source element, and a maximum line-of-sight angle in the line-of-sight angle range is defined by the human eye position and the human eye viewing angle.

3. The head-mounted display device of claim 1, wherein a plurality of planes in which the plurality of absorbing structures are located all pass through the human eye position, or planes in which the plurality of absorbing structures are located are parallel to each other.

4. The head-mounted display device of claim 1, wherein the plurality of absorbing structures are attached to a surface of the substrate, or the plurality of absorbing structures are embedded in the substrate.

5. The head-mounted display device of claim 1, wherein the plurality of absorbing structures are distributed as a micro-structure array.

6. The head-mounted display device of claim 1, wherein the absorbing element is configured as a flat plate or a curved plate.

7. The head-mounted display device of claim 1, wherein the absorbing element comprises a light absorbing coating.

8. The head-mounted a display device of claim 7, wherein an absorbing band of the light absorbing coating comprises an entire visible light band.

9. The head-mounted display device of claim 1, wherein an end of the absorbing element is attached to at least one of the end of the beam splitter element away from the image source element and an end of the reflective element away from the image source element.

10. The head-mounted display device of claim 1, wherein in a direction of the optical path, the beam splitter element and the reflective element are sequentially arranged downstream of the image source element.

11. The head-mounted display device of claim 1, wherein the substrate comprises a first side adjacent to the beam splitter element and a second side opposite to the first side, each of the plurality of absorbing structures has a head end on the first side of the substrate and a terminal end on the second side of the substrate, a plane passing through the head end and the terminal end of at least a portion of adjacent absorbing structures intersects a normal of a light-emitting surface of the image source element at a point.

12. The head-mounted a display device of claim 11, wherein planes in which the at least a portion of adjacent absorbing structures are located all intersect, on a same straight line, a plane passing through the beam splitter element and parallel to the light-emitting surface of the image source element.

13. The head-mounted display device of claim 1, wherein a plane in which the absorbing element is located passes through the human eye position and the end of the beam splitter element away from the image source element, and a region defined by the human eye mirror position and two ends of the absorbing element covers the first light region.

14. A head-mounted display device, comprising:
an optical imaging apparatus, comprising an image source element, a beam splitter element, and a reflective element configured to be aligned on an optical path; and
an absorbing element, a structure of the absorbing element and a position of the absorbing element relative to the optical imaging apparatus configured to enable the absorbing element to absorb at least a portion of stray light in a first light region and cause real scene light in a second light region to pass through, the first light region being defined by a human eye mirror position and two ends of the beam splitter element, the second light region being defined by a human eye position, a human eye viewing angle, and an end of the beam splitter element away from the image source element, wherein the human eye mirror position is a mirror symmetry point of the human eye position with respect to the beam splitter element, the absorbing element comprises a substrate and a plurality of absorbing structures, the plurality of absorbing structures are arranged sequentially at intervals, gaps are formed between adjacent absorbing structures, planes in which respective absorbing structures are located pass through the human eye position, such that the planes coincide with a direction of line-of-sight of a human eye without blocking a field of vision of a user, and respective light-transmitting regions corresponding to the respective gaps cover the second light region after being combined, wherein a region defined by the human eye mirror position and each of the plurality of absorbing structures covers at least a portion of the first light region, and a region defined by the human eye position and at least one gap covers real scene light in the second light region, wherein the at least one gap is formed by an interval between adjacent absorbing structures; and the substrate is arranged to enable the substrate to allow the real scene light to pass through, wherein a plane in which a first end of a first absorbing structure and a second end of a second absorbing structure passes through the human eye mirror position, the first absorbing structure and the second absorbing structure from the plurality of absorbing structures are adjacent to each other, the first end of the first absorbing structure and the second end of the second absorbing structure are respectively located on two sides of the absorbing element and adjacent to each other, and a second end of the first absorbing structure and a first end of the second absorbing structure are respectively located on two sides of the absorbing element and away from each other.

15. The head-mounted display device of claim 1, wherein the beam splitter element and the reflective element being sequentially arranged downstream of the image source element; and wherein each of the plurality of absorbing structures having a head end on a first side of the substrate and a terminal end on a second side of the substrate, a plane passing through head ends and terminal ends of at least a portion of adjacent absorbing structures intersecting the normal of a light-emitting surface of the image source element at a point.

16. The head-mounted display device of claim 15, wherein the normal of the light-emitting surface of the image source element passes through a center of the beam splitter element.

17. The head-mounted display device of claim 15, wherein planes in which at least a portion of adjacent absorbing structures are located all intersect, on a same straight line, a plane passing through the beam splitter element and parallel to the light-emitting surface of the image source element.

* * * * *